(12) United States Patent
Kariya et al.

(10) Patent No.: US 12,115,593 B2
(45) Date of Patent: Oct. 15, 2024

(54) METHOD FOR MANUFACTURING SHAFT

(71) Applicant: SANJO MACHINE WORKS, LTD., Sanjo (JP)

(72) Inventors: Hiroyuki Kariya, Sanjo (JP); Takahiro Sekine, Sanjo (JP); Fumihiko Hattori, Sanjo (JP); Kazushi Goi, Sanjo (JP); Ryo Kurosawa, Sanjo (JP)

(73) Assignee: SANJO MACHINE WORKS, LTD., Sanjo (JP)

( * ) Notice: Subject to any disclaimer, the term of this patent is extended or adjusted under 35 U.S.C. 154(b) by 37 days.

(21) Appl. No.: 18/008,491

(22) PCT Filed: Apr. 30, 2021

(86) PCT No.: PCT/JP2021/017208
§ 371 (c)(1),
(2) Date: Dec. 6, 2022

(87) PCT Pub. No.: WO2022/085226
PCT Pub. Date: Apr. 28, 2022

(65) Prior Publication Data
US 2023/0211433 A1 Jul. 6, 2023

(30) Foreign Application Priority Data

Oct. 19, 2020 (JP) ................................ 2020-175133
Nov. 26, 2020 (JP) ................................ 2020-196259

(51) Int. Cl.
*B23K 20/02* (2006.01)
*B21D 11/20* (2006.01)
*B23K 37/00* (2006.01)

(52) U.S. Cl.
CPC .......... *B23K 20/028* (2013.01); *B21D 11/203* (2013.01); *B23K 37/003* (2013.01)

(58) Field of Classification Search
CPC ............... B23K 20/028; B23K 37/003; B23K 2101/006; B23K 20/24; B23K 20/02;
(Continued)

(56) References Cited

U.S. PATENT DOCUMENTS 1,763,582 A * 6/1930 Gulick .................. B21C 37/286
  72/368
1,991,988 A * 2/1935 Spatta .................... B21D 53/90
  228/144

(Continued)

FOREIGN PATENT DOCUMENTS

JP 55-019456 A 2/1980
JP 01-102513 U 7/1989
(Continued)

OTHER PUBLICATIONS

Japanese Office Action dated Mar. 3, 2022 in Japanese Application No. 2020-196259.
(Continued)

*Primary Examiner* — Sarang Afzali
*Assistant Examiner* — Darrell C Ford
(74) *Attorney, Agent, or Firm* — Sughrue Mion, PLLC

(57) ABSTRACT

In a method for manufacturing a shaft, and surfaces of a pair of metal sheets are polished, and the metal sheets are each bent into a cylindrical or arcuate shape. The polished end surfaces of the metal sheets are butted together with the end surfaces facing each other. The butted end portions are diffusion-joined, thereby forming a cylindrical member. The cylindrical member is cooled, and ends of the cylindrical member are joined to linking members to form the shaft.

10 Claims, 3 Drawing Sheets

(58) Field of Classification Search
CPC .... B23K 20/12; B23K 20/023; B23K 9/0253;
B23K 2101/06; B21D 11/203; B21D
39/028; B21D 53/90; B21D 5/12; B21D
51/16; B21D 5/10; B23P 15/00; Y02T
10/64; F16C 3/02; H02K 15/14; B21C
37/08; B21C 37/0807; B21C 37/0815;
Y10T 29/5185; Y10T 29/5199
USPC ................ 29/33 D, 33 T; 72/51, 367.1, 368;
228/171, 193–195
See application file for complete search history.

(56) References Cited

U.S. PATENT DOCUMENTS

| | | | | |
|---|---|---|---|---|
| 3,829,959 | A * | 8/1974 | Oeckl | B23Q 3/06 228/171 |
| 2003/0044637 | A1 * | 3/2003 | Hasegawa | C22C 38/12 428/679 |
| 2004/0200881 | A1 * | 10/2004 | Gandy | B23K 9/0253 228/103 |
| 2011/0197987 | A1 * | 8/2011 | Koravos | F16L 59/024 72/368 |
| 2012/0103942 | A1 * | 5/2012 | Pawlak | B23K 11/22 219/67 |
| 2019/0262883 | A1 * | 8/2019 | Middleton, Jr | B21D 22/025 |
| 2020/0124129 | A1 * | 4/2020 | Mohammadi | F16F 9/3257 |

FOREIGN PATENT DOCUMENTS

| | | |
|---|---|---|
| JP | 09-300084 A | 11/1997 |
| JP | 2004-025198 A | 1/2004 |
| JP | 2006-258236 A | 9/2006 |
| JP | 2019-106797 A | 6/2019 |

OTHER PUBLICATIONS

International Search Report for PCT/JP2021/017208 dated Jul. 27, 2021.

International Preliminary Report on Patentability dated Apr. 12, 2022 from the International Bureau in International Application No. PCT/JP2021/017208.

* cited by examiner

METHOD FOR MANUFACTURING SHAFT

CROSS REFERENCE TO RELATED APPLICATIONS

This application is a National Stage of International Application No. PCT/JP2021/017208 filed Apr. 30, 2021, claiming priority based on Japanese Patent Application No. 2020-175133 filed Oct. 19, 2020 and Japanese Patent Application No. 2020-196259 filed Nov. 26, 2020.

TECHNICAL FIELD

The present invention relates to a method for manufacturing a shaft.

BACKGROUND ART

Hollow shafts in which linking members provided with gears and splines are joined by friction welding at both ends of a ready-made pipe member are at times used as shafts for motors, etc. (see Patent Document 1). Such hollow shafts are often employed when there is a strong need to reduce weight, such as with shafts in motors for electric vehicles (EVs).

PRIOR-ART DOCUMENTS

Patent Documents

[Patent Document 1] Japanese Laid-open Patent Application No. 2006-258236

DISCLOSURE OF THE INVENTION

Problem to be Solved by the Invention

When a ready-made pipe member is used, components must be selected from among ready-made components that are prepared in advance by a manufacturer, and there are limitations as to the materials that can be selected.

The present invention was contrived in view of circumstances such as those described above, it being an object of the present invention to provide an unprecedented method for manufacturing a shaft, the method making it possible to broaden the range of materials that can be selected in a pipe member and to improve mass-producibility.

Means for Solving the Problem

The main points of the present invention are described below with reference to the accompanying drawings.

A first aspect of the present invention relates to a method for manufacturing a shaft 1 in which linking members 3 are provided to ends of a cylindrical member 2,
the method being characterized by including:
a polishing step for polishing end surfaces of a metal sheet;
a bending step for bending the metal sheet into a cylindrical or arcuate shape;
a diffusion-joining step for butting together the polished end surfaces of the metal sheet, the end surfaces facing each other in a state in which the metal sheet has been bent into the cylindrical shape, or disposing a plurality of the metal sheets that are bent into an arcuate shape so as to form a cylindrical shape and butting together the polished end surfaces of the metal sheets, and then heating the butted portions so that the butted portions are diffusion-joined, thereby forming the cylindrical member 2;
a cooling step for cooling the post-diffusion-joining-step cylindrical member 2; and
a linking-member-joining step for joining the linking members 3 to the ends of the cylindrical member 2.

A second aspect of the present invention relates to the method for manufacturing a shaft according to the first aspect, characterized in that the polishing step involves polishing the end surfaces of the metal sheet to a surface roughness Ra of 2 μm or less.

A third aspect of the present invention relates to the method for manufacturing a shaft according to the first or second aspect, characterized by including an exterior finishing step for finishing the outer surfaces of linked portions of the cylindrical member 2 and linking members 3.

A fourth aspect of the present invention relates to the method for manufacturing a shaft according to any of the first to third aspects, characterized by including an interior finishing step for finishing the inner surfaces of the butted portions of the cylindrical member 2.

A fifth aspect of the present invention relates to the method for manufacturing a shaft according to any of the first to fourth aspects, characterized in that the linking-member-joining step is carried out through friction welding or shrink-fitting.

A sixth aspect of the present invention relates to the method for manufacturing a shaft according to the fifth aspect, characterized in that the linking-member-joining step is carried out during the cooling step.

A seventh aspect of the present invention relates to the method for manufacturing a shaft according to any of the first to sixth aspects, characterized in that: in the bending step, the metal sheet is bent into a semicylindrical shape; and in the diffusion-joining step, polished end surfaces of a pair of the semicylindrical metal sheets are butted together and diffusion-joined.

An eighth aspect of the present invention relates to a method for manufacturing a shaft 1 in which linking members 3 are provided to ends of a cylindrical member 2,
the method being characterized by including:
a bending step for bending a metal sheet into a cylindrical or arcuate shape;
a diffusion-joining step for butting together the end surfaces of the metal sheet, the end surfaces facing each other in a state in which the metal sheet has been bent into the cylindrical shape, or disposing a plurality of the metal sheets that are bent into an arcuate shape so as to form a cylindrical shape and butting together the end surfaces of the metal sheets, and then heating the butted portions so that the butted portions are diffusion-joined, thereby forming the cylindrical member 2;
a cooling step for cooling the post-diffusion-joining-step cylindrical member 2; and
a linking-member-joining step for joining the linking members 3 to ends of the cylindrical member 2 through friction welding or shrink-fitting,
the linking-member-joining step being carried out during the cooling step.

A ninth aspect of the present invention relates to the method for manufacturing a shaft according to any of the first to eighth aspects, characterized in that the shaft 1 is used in an electric-vehicle (EV) motor.

Effect of the Invention

Due to having the configuration described above, the present invention provides an unprecedented method for manufacturing a shaft, the method making it possible to broaden the range of materials that can be selected in a pipe member and furthermore to improve mass-producibility.

BEST MODE FOR CARRYING OUT THE INVENTION

Figure 1:
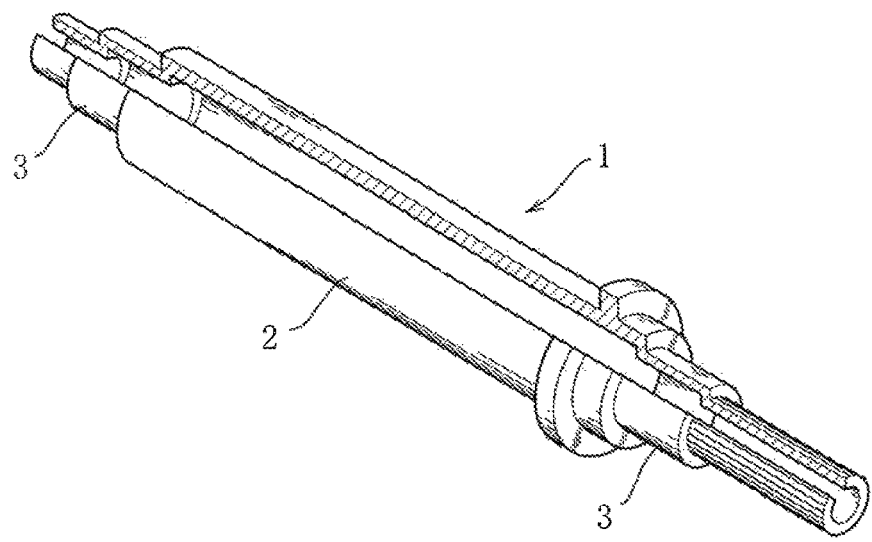
FIG. 1 is a schematic explanatory perspective diagram of a shaft from which a portion is cut away.

Preferred embodiments of the present invention are briefly described below with reference to the drawings while indicating the effects of the present invention.

A metal sheet is bent into a cylindrical shape, and mutually facing ends are butted together and diffusion-joined, thereby producing a cylindrical member 2 that serves as a barrel part of a shaft 1. Linking members 3 having gears, splines, etc., formed thereon are joined to ends of the cylindrical member 2 through friction welding or shrink-fitting etc., to obtain a shaft 1 of, e.g., a rotating body such as an electric-vehicle (EV) motor.

During this process, because the cylindrical member 2 is manufactured by bending the metal sheet into a cylindrical shape and diffusion-joining the resulting article, a broader range of materials can be selected, and it is possible to form a hollow shaft from materials that are suited to a variety of applications. Specifically, with diffusion-joining, it is possible to form the cylindrical member without allowing quench cracking to occur even in the case of a steel material containing a high amount of carbon (high-carbon steel) or a steel alloy having a high alloy-component content (high-alloy steel). As pertains to this feature, in cases where, for example, a metal sheet that is bent into a cylindrical shape is joined by welding, quench cracking readily occurs during welding, and the materials that can be selected are limited to low-carbon steel or low-alloy steel.

Additionally, it is also possible to similarly produce a cylindrical member by bending a metal sheet into an arcuate shape, disposing a plurality of metal sheets that have been bent into an arcuate shape so as to form a cylindrical shape, and butting together mutually facing ends and diffusion-joining the same.

Furthermore, diffusion-welding does not require large-scale equipment (forging apparatuses, etc.) and can be implemented using equipment having relatively high versatility, such as a vacuum furnace provided with a heating device.

Moreover, in the present invention, the ends of the metal sheet, which serve as surfaces being joined, are polished through a polishing step prior to the diffusion-joining, thereby making it possible to efficiently carry out diffusion-joining in a shorter time and to commensurately improve mass-producibility.

Therefore, according to the present invention, e.g., a high-strength steel alloy that cannot be selected in ready-made pipe members can be employed as the metal sheet, thereby making it possible to, inter alia, manufacture a high-strength lightweight shaft 1 that is optimal in applications involving motors for EVs.

It is also possible, for example, to join the linking members 3 through friction welding or shrink-fitting during cooling of the cylindrical member 2 after the diffusion-joining. When this procedure is carried out, heat produced during the diffusion-joining can be utilized and the linking members 3 can be joined without implementing a heating step after the diffusion-joining in the diffusion-joining equipment (vacuum chamber) before the joining of the linking members, and it is possible to manufacture a hollow shaft in an extremely efficient manner.

Example 1

A specific example 1 of the present invention shall be described below with reference to the drawings.

The present example relates to a method for manufacturing a hollow shaft 1 in which linking members 3 are provided to ends of a cylindrical member 2.

Specifically, the method includes: a cutting-out step for extracting a metal sheet from a parent material; a polishing step for polishing end surfaces of the metal sheet; a bending step for bending the metal sheet into a cylindrical shape; a diffusion-joining step for butting together the polished end surfaces of the metal sheet, the end surfaces facing each other in a state in which the metal sheet has been bent into the cylindrical shape, and heating the butted portions so that the butted portions are diffusion-joined, thereby forming the cylindrical member 2; a cooling step for cooling the cylindrical member 2 after the diffusion-joining step; a linking-member-joining step for joining linking members 3 to ends of the cylindrical member 2; and an exterior finishing step.

Figure 2:
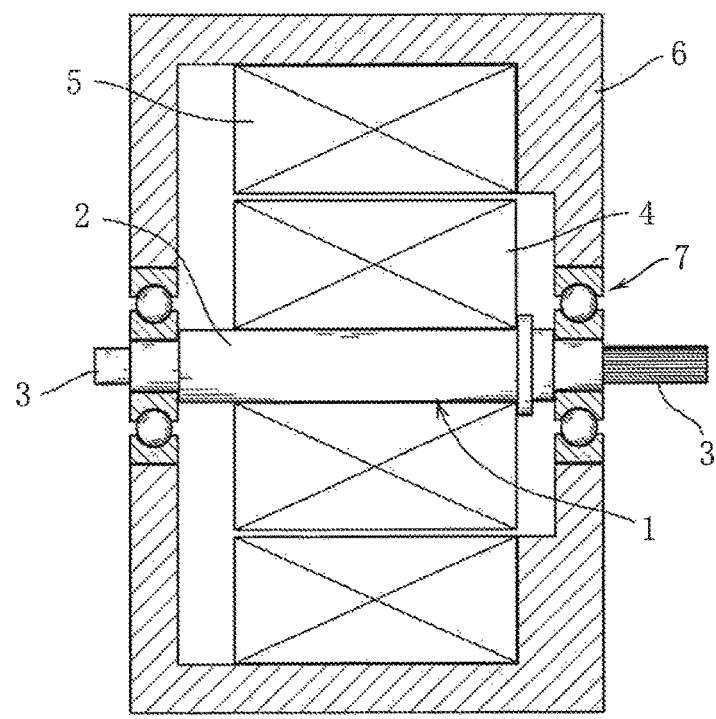
FIG. 2 is a schematic explanatory diagram of an electric-vehicle (EV) motor.

In the shaft 1 according to the present example, the metal linking members 3, which are provided with engagement parts such as gears and splines, are joined to both ends of the metal cylindrical member 2, as shown in FIG. 1. Therefore, the shaft 1 according to the present invention is used as a shaft 1 of an EV motor, as shown in, e.g., FIG. 2. In FIG. 2, reference 4 indicates a rotor, reference 5 indicates a stator, reference 6 indicates a casing, and reference 7 indicates a bearing.

The cylindrical member 2 is formed by bending the metal sheet into a cylindrical shape and diffusion-joining the opposing ends thereof. Steel sheets or non-ferrous metal sheets (e.g., high-tensile-strength steel sheets, stainless steel sheets, or titanium alloy sheets, etc.) that have been cut out to a prescribed size can be employed as the metal sheet.

The steps shall now be described in detail.

Figure 3:
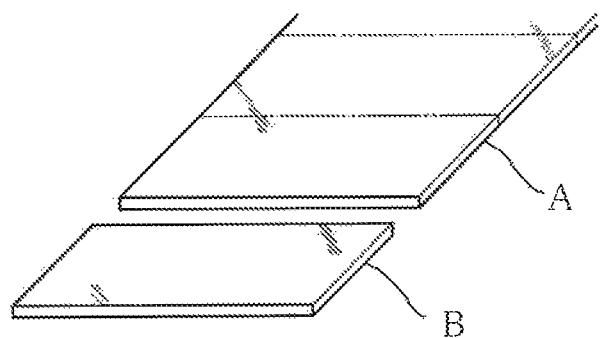
FIGS. 3(a)-3(e) are explanatory diagrams of the steps of example 1.
Figure 3:
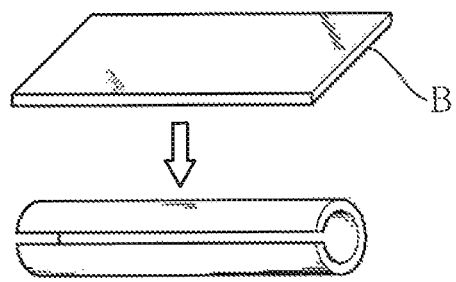
Figure 3:
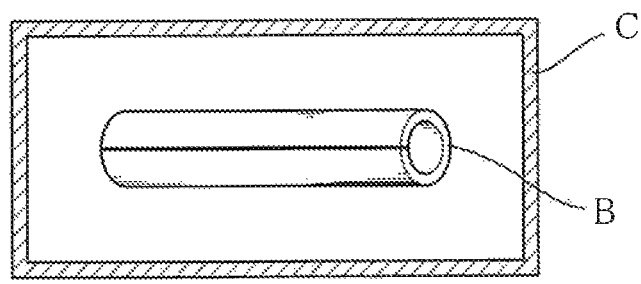
Figure 3:
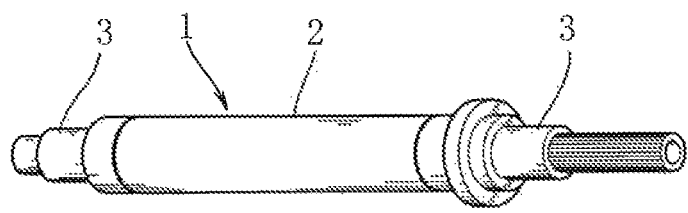
Figure 3:
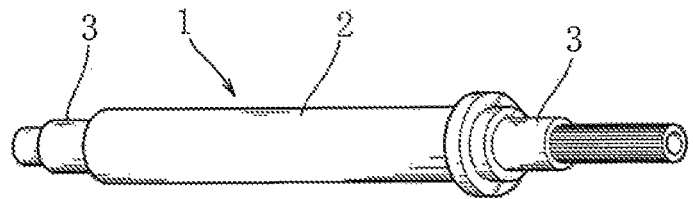

In the cutting-out step, a metal sheet B of a prescribed size is cut out from a parent material A (FIG. 3(a)).

In the polishing step, ends of the metal sheet B that face each other when the metal sheet B is bent into a cylindrical shape during the bending step are polished. Specifically, each of the ends is polished to a surface roughness Ra of 2 µm or less. Due to this polishing, atoms in the joining surface are satisfactorily diffusion-joined, and diffusion-joining is firmly carried out in a short time.

Next, in the bending step, the metal sheet B of which the ends were polished is rolled up into a cylindrical shape using a forging mold or bending roll machine (FIG. 3(b)). In the case of a sheet that is composed of a high-strength material or that has a high sheet thickness, the metal sheet B is rolled up while being heated to within a warm range (about 300-800° C.) or a hot range (about 1,000-1,300° C.). The polishing step and the bending step can be carried out in the opposite order.

Next, in the diffusion-joining step, the metal sheet is introduced into a vacuum furnace (diffusion-joining furnace C), the polished end surfaces of the metal sheet that has been rolled up into a cylindrical shape are butted together, a rod-form jig having an outer peripheral surface that follows the inner surface of the metal sheet is arranged on the inner side, a tube-form jig having an inner peripheral surface that follows the outer surface of the metal sheet is arranged on the outer side, the butted portions are clamped from the inside and outside and are heated to about 900-1,000° C. while being pressed using a prescribed pressure (about 5-10 MPa), and this temperature is maintained for a prescribed time (several tens of minutes to several hours) (FIG. 3(c)). While the temperature is maintained, a vacuum atmosphere ranging from about $10^{-6}$ Pa to about $10^{-3}$ Pa is sustained inside the vacuum furnace.

By using diffusion-joining, uniform strength and other characteristics are obtained across the entire circumference to a greater extent than joining using welding.

Next, in the cooling step, the heating is stopped and the post-diffusion-joining-step cylindrical member 2 is allowed to cool naturally inside the vacuum furnace.

Next, in the linking-member-joining step, the linking members 3, which have gear parts or spline parts formed thereon, are joined through friction welding or shrink-fitting (FIG. 3(d)).

The friction welding is performed using a typical friction welding machine. The shrink-fitting is performed using a temperature of, e.g., 150-180° C.

In the exterior finishing step, a finishing process such as cutting or polishing is then performed in order to remove irregularities, etc., on the outer-surface side of linked portions of the cylindrical member 2 and linking members 3 (FIG. 3(e)).

Members that are hollowed such that the material thereof gradually decreases in diameter toward the outer side through cold or hot forging, and that then have gears or splines formed thereon through a mechanical process (cutting process, gear process, spline rolling, etc.) performed on the outer surfaces thereof, are used as the linking members 3. Additionally, surfaces that are to be friction-welded to the cylindrical member 2 are formed through a cutting process.

The shaft 1 can be formed through the steps described above, but an interior finishing step can also be included as necessary. In the interior finishing step, a finishing process such as cutting or polishing for removing irregularities, etc., on the inner-surface side of the butted portions of the cylindrical member 2 is performed, this step being performed after the diffusion-joining step and before the linking-member-joining step.

Additionally, the linking-member-joining step can be performed during the cooling step as necessary.

Specifically, the linking members 3 can be joined to the ends of the cylindrical member 2 through friction welding or shrink-fitting once a prescribed temperature is reached over the course of cooling of the cylindrical member 2 after diffusion-joining. For example, in order to prevent oxidation, the cylindrical member 2 is retained inside the vacuum furnace until reaching about 200° C., removed from the vacuum furnace upon having reached about 200° C., and shrink-fitted, etc. When this procedure is carried out, the linking members 3 can be joined using the heat produced during the diffusion-joining. The cylindrical member 2 is then allowed to cool naturally to room temperature.

The diffusion-joining step, cooling step, and linking-member-joining step can be performed using the same vacuum furnace. Specifically, after the diffusion-joining, the linking members 3 can be joined to the cylindrical member 2 upon having reached a prescribed temperature without the cylindrical member 2 being retrieved from the vacuum furnace, and the cylindrical member 2 and linking members 3 joined after cooling is completed can be retrieved.

Because the present invention is configured as described above, a broader range of materials can be selected, and it is possible to form the shaft 1 using materials that are suited to a variety of applications. Specifically, with diffusion-joining, it is possible to form the cylindrical member without allowing quench cracking to occur even in the case of a high-carbon steel or a high-alloy steel.

Furthermore, diffusion-welding does not require large-scale equipment and can be implemented using equipment having relatively high versatility, such as a vacuum furnace provided with a heating device.

Moreover, the ends of the metal sheet, which serve as surfaces being joined, are polished through a polishing step prior to the diffusion-joining, thereby making it possible to efficiently carry out diffusion-joining in a shorter time and to commensurately improve mass-producibility.

Therefore, a high-strength steel alloy that cannot be selected in ready-made pipe members can be employed as the metal sheet, thereby making it possible to, inter alia, manufacture a high-strength lightweight shaft 1 that is optimal in applications involving motors for EVs.

Thus, the present example provides a method for manufacturing a shaft, the method making it possible to broaden the range of materials that can be selected in the pipe member and to improve mass-producibility.

Example 2

Whereas in example 1 the cylindrical member 2 was obtained by rolling up one metal sheet into a cylindrical shape and diffusion-joining the resulting article, in the present example a cylindrical member 2 is obtained by bending a plurality of metal sheets into an arcuate shape (such that each of the metal sheets constitutes a portion of a cylindrical member), disposing the bent metal sheets so as to form a cylindrical shape, and then diffusion-joining the resulting article.

Figure 4:
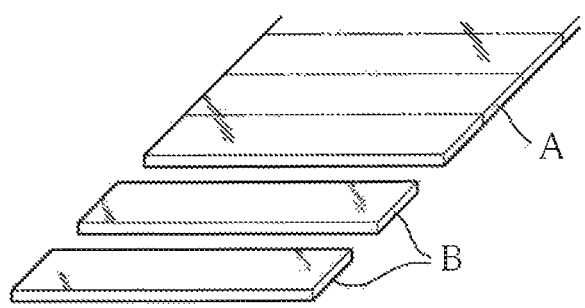
FIGS. 4(a)-4(e) are explanatory diagrams of the steps of example 2.
Figure 4:
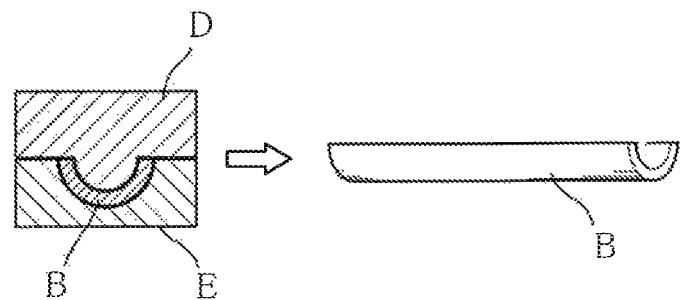
Figure 4:
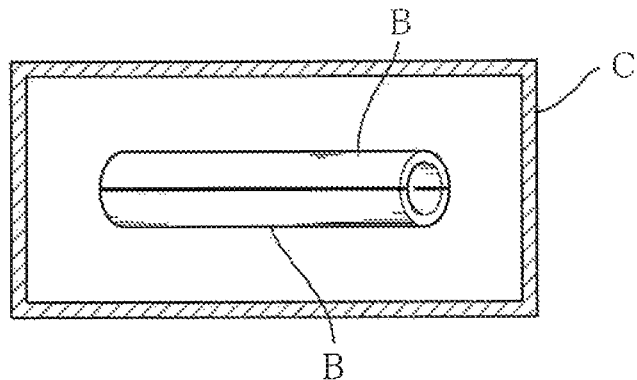
Figure 4:
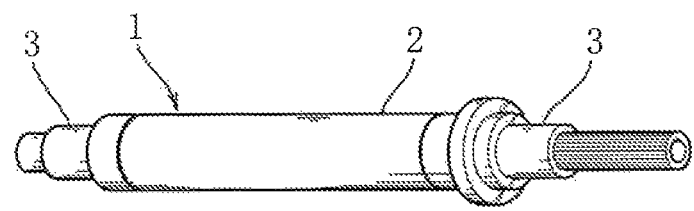
Figure 4:
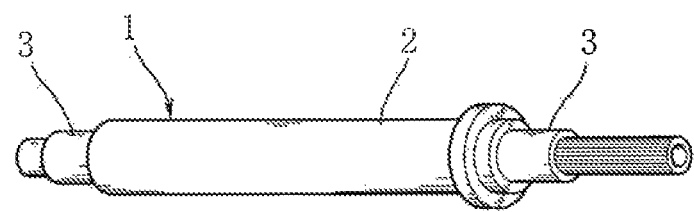

Specifically, in the present example, two metal sheets B that are cut out from a parent material A as shown in FIG. 4(a) are, in a bending step, clamped between an upper die D (convex die) and a lower die E (concave die) and are caused to follow the convex/concave shape of the upper and lower dies, whereby each of the metal sheets B is bent into a semicylindrical shape (FIG. 4(b)). Therefore, few man-hours are needed for bending, and also few dies are needed.

The pair of semicylindrical metal sheets B are butted together with the end surfaces thereof facing each other, and the butted ends are diffusion-joined, whereby a cylindrical member 2 is obtained (FIG. 4(c)).

Linking members 3 having gears or splines formed thereon are subsequently joined to both ends of the cylindrical member 2 through friction welding or shrink-fitting (FIG. 4(d)), in the same manner as in example 1. A finishing process such as cutting or polishing is then performed in order to remove irregularities, etc., on the outer-surface side of linked portions of the cylindrical member 2 and linking members 3 (FIG. 4(e)).

In a diffusion-joining step according to the present example, the two semicylindrical metal sheets, which are disposed facing each other so as to form a cylindrical shape, are clamped and pressed from above and below using jigs, whereby pressurization and heating of the butted end surfaces is maintained for a prescribed time. Jigs that are provided as a vertically opposed pair and that have concavely curved surfaces following the outer peripheral surfaces (convexly curved surfaces) of each of the semicylindrical metal sheets are used as the jigs for clamping and pressing the metal sheets from above and below.

When the semicylindrical metal sheets are clamped and pressed from above and below using jigs, a cylindrical (or round columnar) jig that supports the metal sheets from the inner side thereof can be disposed on the inner side of the metal sheets.

Due to the use of two semicylindrical metal sheets, the butted end surfaces, which are parallel to each other due to being configured as horizontal surfaces, are butted together when the butted end surfaces are subjected to the finishing process (obviating the need to calculate the angle of the end surfaces), and the polishing process, etc., is also made easier and less expensive. Additionally, it is sufficient for a vector for pressurization during the diffusion-joining to have a plumb-vertical direction (direction orthogonal to the butted end surfaces), and pressurization (and maintenance of the pressurization) is commensurately facilitated (the structures of the jigs can be simplified).

In the present example, the cylindrical member 2 is formed using two metal sheets (of substantially the same shape) that are bent into semicylindrical shapes, but it is also permissible to form the cylindrical member 2 using three or more metal sheets (of substantially the same shape) that are bent into arcuate shapes.

All remaining features are the same as in example 1.

The invention claimed is:

1. A method for manufacturing a shaft, comprising: comprising
    polishing end surfaces of a pair of metal sheets to a surface roughness Ra of 2 μm or less;
    bending each metal sheet of the pair of metal sheets into a semicylindrical shape;
    disposing the pair of the metal sheets that are bent into a semicylindrical shape together so as to form a cylindrical shape by butting together the polished end surfaces of the metal sheets, and then heating the butted portions so that the butted portions are diffusion-joined, thereby forming the cylindrical member;
    cooling the cylindrical member;
    joining linking members to ends of the cylindrical member to form the shaft; and
    cutting or polishing the inner surfaces of the butted portions of the cylindrical member,
    wherein in the forming of the cylindrical member, parallel and horizontally disposed end surfaces of the pair of semicylindrical metal sheets are directly butted together, and entireties of the end surfaces are diffusion-joined while pressurized so as to be pressed together in a direction orthogonal to the end surfaces.

2. The method for manufacturing a shaft according to claim 1, further comprising finishing the outer surfaces of linked portions of the cylindrical member and the linking members.

3. The method for manufacturing a shaft according to claim 1, wherein the diffusion-joining of the pair of the metal sheets that are bent into the semicylindrical shape is carried out through friction welding or shrink-fitting.

4. The method for manufacturing a shaft according to claim 3, wherein the joining the linking members to the ends of the cylindrical member is carried out during the cooling step.

5. The method for manufacturing a shaft according to claim 1, wherein the shaft is used in an electric-vehicle (EV) motor.

6. A method for manufacturing a shaft, comprising:
    polishing end surfaces of a pair of metal sheets;
    bending each metal sheet of the pair of metal sheets into a semicylindrical shape;
    disposing the pair of the metal sheets that are bent into a semicylindrical shape together so as to form a cylindrical shape by butting together the polished end surfaces of the metal sheets, and then heating the butted portions so that the butted portions are diffusion-joined, thereby forming the cylindrical member;
    cooling the cylindrical member; and
    joining linking members to ends of the cylindrical member through friction welding or shrink-fitting during the cooling to form the shaft,
    wherein in the forming of the cylindrical member, parallel and horizontally disposed end surfaces of the pair of semicylindrical metal sheets are butted together, and entireties of the end surfaces are diffusion-joined while pressurized so as to be pressed together in a direction orthogonal to the end surfaces.

7. The method for manufacturing a shaft according to claim 6, wherein the end surfaces of the metal sheet are polished to a surface roughness Ra of 2 μm or less.

8. The method for manufacturing a shaft according to claim 6, further comprising finishing outer surfaces of linked portions of the cylindrical member and the linking members.

9. The method for manufacturing a shaft according to claim 6, further comprising finishing inner surfaces of the butted portions of the cylindrical member.

10. The method for manufacturing a shaft according to claim 6, wherein the shaft is used in an electric-vehicle (EV) motor.

* * * * *